UNITED STATES PATENT OFFICE.

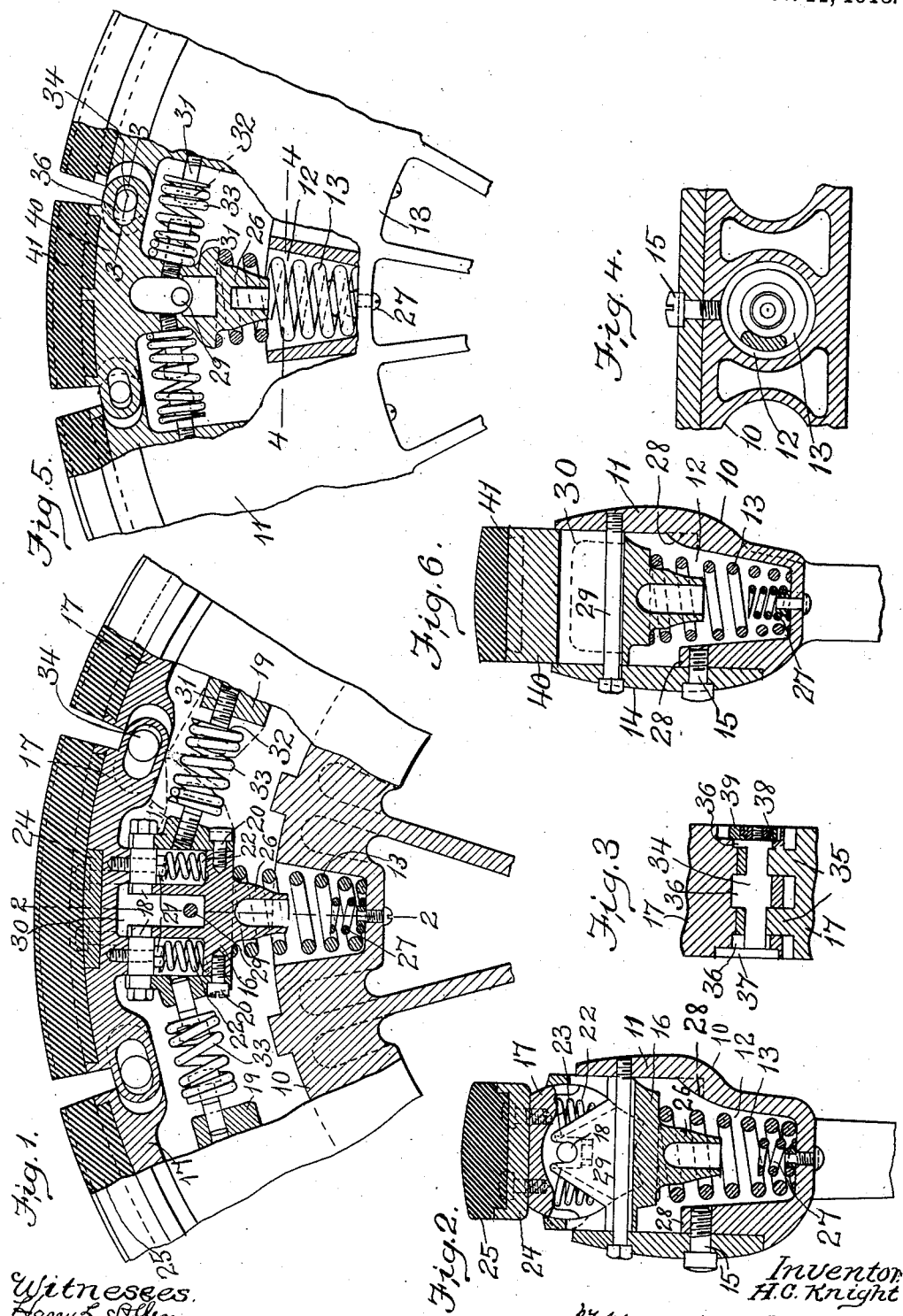

HERBERT C. KNIGHT, OF PORTLAND, MAINE.

SPRING-WHEEL.

1,078,150.　　　　　Specification of Letters Patent.　　Patented Nov. 11, 1913.

Application filed July 6, 1911. Serial No. 637,180.

*To all whom it may concern:*

Be it known that I, HERBERT C. KNIGHT, of Portland, in the county of Cumberland and State of Maine, have invented certain new and useful Improvements in Spring-Wheels, of which the following is a specification.

This invention relates to vehicle wheels and has particular reference to that type in which resilience of the tread is provided for by springs instead of by pneumatic tire.

One of the objects of the invention is to provide a wheel of this type which presents a tread which, at any point, is capable of a universal yielding to attain as closely as possible the effect of a pneumatic tire.

Another object is to provide a structure having the rim composed of a series of sections which are held in their normal positions by the balance of springs acting in opposite directions.

Other objects are to provide a simple, durable, and effective wheel of this character, by improvements which will be described and pointed out in the appended claims.

Of the accompanying drawings,—Figure 1 is a side elevation, partly broken out and in section, of a sufficient portion of a wheel to illustrate my invention in one of its embodiments. Fig. 2 represents a section on line 2—2 of Fig. 1. Fig. 3 represents a section on line 3—3 of Fig. 1. Fig. 4 represents a section on line 4—4 of Fig. 5. Figs. 5 and 6 are views similar to Figs. 1 and 2 respectively, of different embodiments of some of the features of my invention.

Similar reference characters indicate the same or similar parts in all of the views.

The body of the wheel, having any suitable spoke and hub construction, may be formed as a casting, including the inner rim 10 and flange 11. The rim 10 is provided with radial, and preferably inwardly tapering, pockets 12, for the helical load springs 13. A flange 14 opposite the flange 11 is removably secured to the rim 10 by screws or bolts 15.

The springs 13 support a circular series of yieldingly connected blocks or sections which compose the yielding or flexible outer rim of the wheel. In the construction shown in Figs. 1 and 2, each of said blocks or sections consists of two members 16 and 17, pivotally connected by trunnions 18, the outer ends of which pass through apertures in the upper ends of two end plates 19, the lower ends of which are connected by bolts 20 with the inner member 16. The trunnions are secured to the outer member 17 by bolts 21. By this construction the two members 16 and 17 are held together so that they can only move radially as a whole, while providing a pivotal connection that enables the outer member to rock or tilt under lateral pressure when the automobile or other vehicle equipped with such wheels tends to cause extra pressure toward one side. To yieldingly resist such rocking or tilting of the outer member 17, suitable springs 22 are provided. I illustrate four of such springs contained in suitable spaces provided therefor, two on each side of each trunnion, said springs bearing against the bottom of said spaces and suitable faces or shoulders 23 presented by the outer member 17. Secured to the outer face of the outer member 17 is a plate or shoe 24 carrying a tread piece 25 of rubber or other desirable material. Projecting inwardly from the inner member 16 is a lug or nipple 26 which enters the upper end of spring 13. Within the lower end of spring 13 is an auxiliary spring 27 the length of which relatively to the length of nipple 26, is such that before the load spring 13 is unduly collapsed, the lower end of the nipple will contact with the auxiliary spring so that the latter will also oppose the results of severe jolts or shocks before the shoulders or abutments 28 of the inner member are reached by the portions of the outer member which are formed to coact with said shoulders or abutments to finally limit compression of the springs. Said shoulders 28 may be abrupt, as shown at the left in Fig. 2, or inclined as shown at the right in said figure.

All of the blocks or sections which compose the rim or circular series, are connected together as presently described; but it is desirable that each section shall be individually held to substantially a given position radially of the wheel. Therefore, I provide a guiding bolt 29 mounted in flanges 11, 14, said bolt passing through a radially elongated space 30 which is not only long enough to permit the block or section to have all necessary radial movement, but is also wide enough to permit said block or section to move somewhat in the direction of the plane of the wheel, as under a sudden excess of power applied to a driving axle having such wheels, or when brakes are suddenly applied. Such movement of the block or section is resisted more or less by the mounting of the springs 13 in their pockets, but it is also resisted by all of the springs 13 of the series owing to the connections between all of the sections as presently described. It will therefore be understood that, within the limits prescribed by the construction of the wheel, the tread surfaces of the blocks or sections are capable of an absolute universal movement relatively to the body of the wheel, as is the case with the tread surface of a pneumatic tire, and that the movements in any direction are spring-opposed. This universal movement is permitted because the outer member 17 can rock laterally about the axis of the trunnions 18, which latter are carried by the inner member 16 of the section. Said inner member is free to rock in the direction of the circumference of the wheel within the limits prescribed by the pin and slot connections between the outer members of the sections. This last mentioned rocking is controlled by the springs 13 and 33, which latter will be presently described. As the two planes of permissible rocking are at a right angle to each other and since the compound sections 16, 17 can yield inwardly between the flanges 11 and 14, the result is that the tread portion of each section is permitted to have a universal movement within the limits prescribed by the construction illustrated and described. As shown in Fig. 2, all strain of lateral pressure is not borne by the trunnions 18, for the sides of portions of the outer member 17 are shaped as arcs struck from the center of the trunnions, and these arc-shaped sides fit corresponding surfaces of portions of the inner member 16.

Secured in each end plate 19 is a headed projection, such as a strong screw 31, a collar 32 being mounted on the screw back of its head. The collars 32 of each pair of opposing adjacent screws are connected by a spring 33 normally under tension to tend to draw the blocks or sections toward each other, the tendency of the entire series of springs 33 being to reduce the diameter of the rim made up of the series of sections, in opposition to the load springs 13. The normal diameter of the rim is therefore effected by a balance between the springs 13 and 33 so that excepting in case of excessive shock or jolt, no resilient movement in any direction is brought to a sudden termination; this results in securing a smooth and easy running.

Preferably the members 17 are connected directly together at their adjacent ends, and by such sliding connections as will permit them to approach and recede from each other and to also permit them to rock or oscillate endwise relatively to each other. As shown in Figs. 1, 3, and 5, the ends of the members 17 have alternating projections and recesses which slidingly fit together. A pin or bolt 34 is mounted in openings in the projections 35 of one member 17 and passes through slots 36 in the projections of the next member 17. The head 37 of the bolt is elongated (see Figs. 3 and 5) and fits an elongated recess in the outer face of one of the projections, so that said bolt is thereby held from turning. The nut 38 of the bolt is surrounded by a washer 39 which fits an elongated recess in the outer face of a projection at the other side of the member 17. This construction permits of the relative movements of the blocks or sections as described, and so that only a very small portion of the sectional rim will be moved toward the axle (one, two or three sections) due to the weight of the vehicle. The bolts 34 normally occupy positions intermediate the ends of the slots 36, due to the action of springs 13 in one direction and the action of springs 33 in the opposite direction.

Practically the only difference between the construction shown in Figs. 5 and 6 and that shown in Figs. 1 and 2, is that in said Figs. 5 and 6 the blocks or sections, instead of being made of two members each, are single blocks or sections 40 having resilient tread pieces 41 secured in any suitable manner to their outer faces. Such single blocks have spaces 30 for the bolts 29, are pressed outwardly by springs 13, and held together by springs 33 and jointed together by bolts 36, all substantially the same as in Figs. 1 and 2.

I claim:

1. A vehicle wheel having a rigid rim provided with radial pockets, and an outer yielding rim composed of a series of spaced sections each having a transverse opening, the rigid rim having transverse pins passing through said openings, the openings being larger than the pins to permit the sections to move radially and toward and from each other, said sections having slot and pin connections with each other, load springs in the radial pockets to resist inward movement of the sections, and springs connecting the sections together, the last mentioned springs being under tension to act to reduce the diameter of the series of sections in opposition to the load springs.

2. A vehicle wheel having a rigid rim provided with radial pockets, and an outer yielding rim composed of a series of spaced sections each having a transverse opening, the rigid rim having transverse pins passing through said openings, the openings being larger than the pins to permit the sections to move radially and toward and from each other, said sections comprising inner and outer members pivotally connected, the pivots being substantially at a right angle to the said transverse pins whereby the outer members can tilt laterally relatively to the inner members, the outer members having slot and pin connections with each other, load springs in the radial pockets to resist inward movement of the compound sections, springs connecting the sections together, the last mentioned springs being under tension to act to reduce the diameter of the series of compound sections in opposition to the load springs, and springs for resisting lateral tilting of the outer members of the sections.

3. A spring wheel having its rim composed of a series of loosely connected sections each being yieldingly movable radially, springs connecting the sections, each section comprising inner and outer members, the outer members being mounted to tilt laterally relatively to the inner members, and springs between the inner and outer members of the sections.

In testimony whereof I have affixed my signature, in presence of two witnesses.

HERBERT C. KNIGHT.

Witnesses:
WINFIELD S. HOVEY,
LIZZIE L. KNIGHT.

Copies of this patent may be obtained for five cents each, by addressing the "Commissioner of Patents, Washington, D. C."